No. 811,793. PATENTED FEB. 6, 1906.
J. R. REYNOLDS.
METHOD OF MAKING WATERPROOF WELTS.
APPLICATION FILED SEPT. 21, 1905.
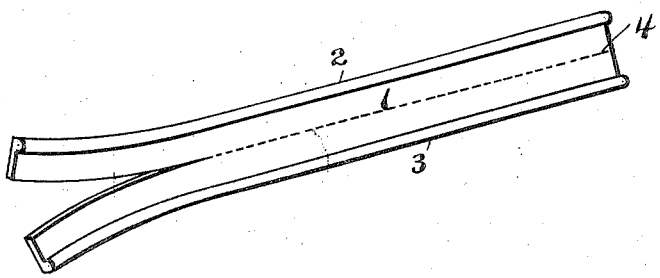
Witnesses
Inventor
John R. Reynolds
By his Attorneys

UNITED STATES PATENT OFFICE.

JOHN R. REYNOLDS, OF HARTFORD, CONNECTICUT, ASSIGNOR TO THE WATERPROOF WELT AND FILLER COMPANY, OF HARTFORD, CONNECTICUT, A CORPORATION OF DELAWARE.

METHOD OF MAKING WATERPROOF WELTS.

No. 811,793.  Specification of Letters Patent.  Patented Feb. 6, 1906.

Application filed September 21, 1905. Serial No. 279,408.

*To all whom it may concern:*

Be it known that I, JOHN R. REYNOLDS, a citizen of the United States, residing at Hartford, county of Hartford, and State of Connecticut, have invented certain new and useful Improvements in Methods of Making Waterproof Welts, fully described and represented in the following specification and the accompanying drawings, forming a part of the same.

This invention relates to certain improvements in the manufacture of waterproof welt for boots and shoes.

A demand has arisen in the trade for a waterproof welt, said welt being used in the manufacture of waterproof boots and shoes and being located between the usual leather welt and the upper, the threads which secure the usual leather welt to the upper passing also through the waterproof welt, so that the welt forms a waterproof dam for the seam. This welt in the form in which it has been principally employed consists of a strip of thin rubber having on the edge which is to become the outside edge when the welt is in position in the shoe a round, this round being generally in the form of a bead. Boots and shoes are, however, now practically almost entirely made by machinery, and in order that this rubber welt may be practically used it is necessary that it be made in long strips— say from fifteen up to thirty yards—these strips being suitably packaged and mounted in the machine so as to be fed to the machine in the same manner as and simultaneously with the leather welt. Attempts have been made to make this rubber welt in molds. As a practical proposition it is not possible to make long strips of this welt in molds. The expedient was therefore resorted to of cutting long narrow strips from unvulcanized sheet-rubber. The ends of these rubber strips were then placed in molds of a proper shape to produce the final article, and these ends while thus in the molds and connected to the strips were vulcanized. After the vulcanization of sections about the length of the mold was completed the molds were opened, and these strips were advanced through the molds a distance nearly equal to the length of the molds, a short vulcanized section, perhaps an inch or more, being left in the molds and then the next succeeding section of the strip vulcanized, this process being repeated until the entire length of strip was molded and vulcanized. In order to insure the molds being properly filled, the rubber sheets were of a thickness to provide a slight surplus, and provision was necessarily made for the disposition of this surplus, this provision consisting of a longitudinal opening alongside that part of the mold which formed the bead, this opening being called an "overflow." The result of this was that the molded strip showed a fin on its beaded edge which had to be removed in order to give the article a finished appearance. Further, it was found difficult to produce a strip the vulcanized sections of which were precisely the same in all their dimensions, the difficulty occurring particularly at the points where successive vulcanized sections joined, and when the strips varied in dimensions to any considerable amount difficulty was experienced in feeding them properly to the shoe-sewing machines. Further, this process of making welts was very slow and the expense of manufacture therefore large.

The present invention has for its object to produce a waterproof welt by an improved method whereby the welt can be made in any desired length and uniform in its dimensions, so that it can be readily handled in the shoe-sewing machinery, the method being of such a character as to greatly simplify the manufacture of the welt, and therefore greatly reduce the cost of manufacture.

The process which forms the subject of this invention will first be described and then specifically pointed out.

The drawing illustrates in perspective view a strip of the preferred form of material produced during the manufacture of the welt, the strip being cut at its end to illustrate the final step in the manufacture of the welt.

In accordance with the invention a plastic material—such, for instance, as rubber or a rubber composition into which pure rubber enters largely—is placed in a plastic condition in a suitable reservoir. From this reservoir the mass is forced continuously through a die, by which the plastic mass is converted into a thin strip. A die which will produce a strip having a plurality of beads with a flat portion between the beads, the strip being adapted to be cut between the beads in the manner hereinafter to be described, has been found by experiment to be particularly advantageous in the carrying out of the method. The die may be of such configuration as to form the strip illustrated in the drawing, this strip having a central flat portion 1 and beads 2 and 3 on its edges. With a die which will produce a strip of this shape the strip comes evenly out of the die—that is, both edges and the center come out of the die at the same rate of speed, so that an even and uniform product results—whereas if it be attempted to produce a strip having a bead at one edge only the material is apt to be forced through the die more rapidly on one edge than on the other, owing to the unequal dimensions of the two sides of the die, so that a strip is produced which is longer on one edge than on the other. After the strip has been thus produced by forcing the plastic composition through the die it is cured or vulcanized according to any well-known method. After the strip has been vulcanized it is converted into welts by cutting between the beads. The particular form of strip illustrated will be converted into welts by cutting it midway between the beads, as indicated by the dotted line 4, the material being shown as partially cut in the drawing. After the strip has been thus cut the welts formed thereby are packaged in any suitable manner—as, for instance, rolled up on spools—and they are then ready to be placed in the shoe-sewing machines, by which they are sewed into the boots or shoes.

It will be seen that according to the method described welt can be produced continuously, and therefore rapidly, and at very little expense. Furthermore, the beads or rounds formed by the die will be smooth, so that the welt requires no subsequent finishing, and, finally, the finished product is absolutely uniform, so that it can be readily handled in the sewing-machines.

What is claimed is—

1. The method of making a waterproof welt which consists in placing a mass of vulcanized waterproof material in a plastic condition in a suitable receptacle, forcing the mass through a die to form a thin flat strip having a plurality of rounds or beads thereon, vulcanizing the strip and finally cutting the strip between the beads to form a plurality of welts.

2. The method of making a waterproof welt which consists in placing a mass of vulcanized waterproof material in a plastic condition in a suitable receptacle, forcing the mass through the die to form a thin flat strip having a bead on each edge, vulcanizing the strip and finally cutting the strip midway between the beads to form two welts.

In testimony whereof I have hereunto set my hand in the presence of two subscribing witnesses.

JOHN R. REYNOLDS.

Witnesses:
AUGUSTA WHITE,
PHILIP N. TILDEN.